US012571591B2

(12) United States Patent　　　(10) Patent No.:　US 12,571,591 B2
Häusl　　　　　　　　　　　　　　　(45) Date of Patent:　　Mar. 10, 2026

(54) STRETCHING UNIT AS WELL AS METHOD FOR REDUCING NON-UNIFORM TEMPERATURES AND AIR FLOWS IN A FILM STRETCHING UNIT

(71) Applicant: BRÜCKNER MASCHINENBAU GMBH, Siegsdorf (DE)

(72) Inventor: Tobias Häusl, Traunstein (DE)

(73) Assignee: BRÜCKNER MASCHINENBAU GMBH, Siegsdorf (DE)

( * ) Notice: Subject to any disclaimer, the term of this patent is extended or adjusted under 35 U.S.C. 154(b) by 376 days.

(21) Appl. No.: 18/324,561

(22) Filed: May 26, 2023

(65) Prior Publication Data

US 2023/0384033 A1　　Nov. 30, 2023

(30) Foreign Application Priority Data

May 30, 2022　(DE) ..................... 10 2022 113 534.9

(51) Int. Cl.
　　*F27B 9/04*　　　　(2006.01)
　　*B29C 35/00*　　　(2006.01)
　　　　　　(Continued)

(52) U.S. Cl.
　　CPC ............ *F27B 9/045* (2013.01); *B29C 35/002* (2013.01); *B29C 35/06* (2013.01); *B29C 55/02* (2013.01);
　　　　　　(Continued)

(58) Field of Classification Search
　　CPC .......... F27B 9/045; F27B 9/28; F27B 9/3005; F27B 9/3011; B29C 35/002; B29C 35/06; B29C 55/02; B29L 2007/008
　　See application file for complete search history.

(56) References Cited

U.S. PATENT DOCUMENTS 2,328,827　A　*　9/1943　Martin ................... B29C 55/08
　　　　　　　　　　　　　　　　　264/DIG. 73
6,109,914　A　*　8/2000　Matsuo ................... F27D 17/10
　　　　　　　　　　　　　　　　　432/179
(Continued)

FOREIGN PATENT DOCUMENTS

EP　　　　3398750　　　11/2018
JP　　　2002018970　　　1/2022
(Continued)

OTHER PUBLICATIONS

WO-2022116547-A1 translation (Year: 2025).*

*Primary Examiner* — Michael G Hoang
*Assistant Examiner* — Kurt J Wolford
(74) *Attorney, Agent, or Firm* — Nixon & Vanderhye, PC

(57)　　　　　　ABSTRACT

A stretching unit for stretching a film is disclosed having an oven and a compensation device. The compensation device includes an air conveyor, the first compensation opening and a second compensation opening, in which the first compensation opening and the second compensation opening open into the oven on opposing sides of a central plane (M) of the oven in the vertical and drawing directions (H, R). The air conveyor is located in terms of flow between the first compensation opening and the second compensation opening, in which the compensation device is configured to remove a volume of air from the oven through one of the compensation openings and to feed the removed volume of air into the oven through the other one of the compensation openings.

18 Claims, 6 Drawing Sheets

Figure 1:
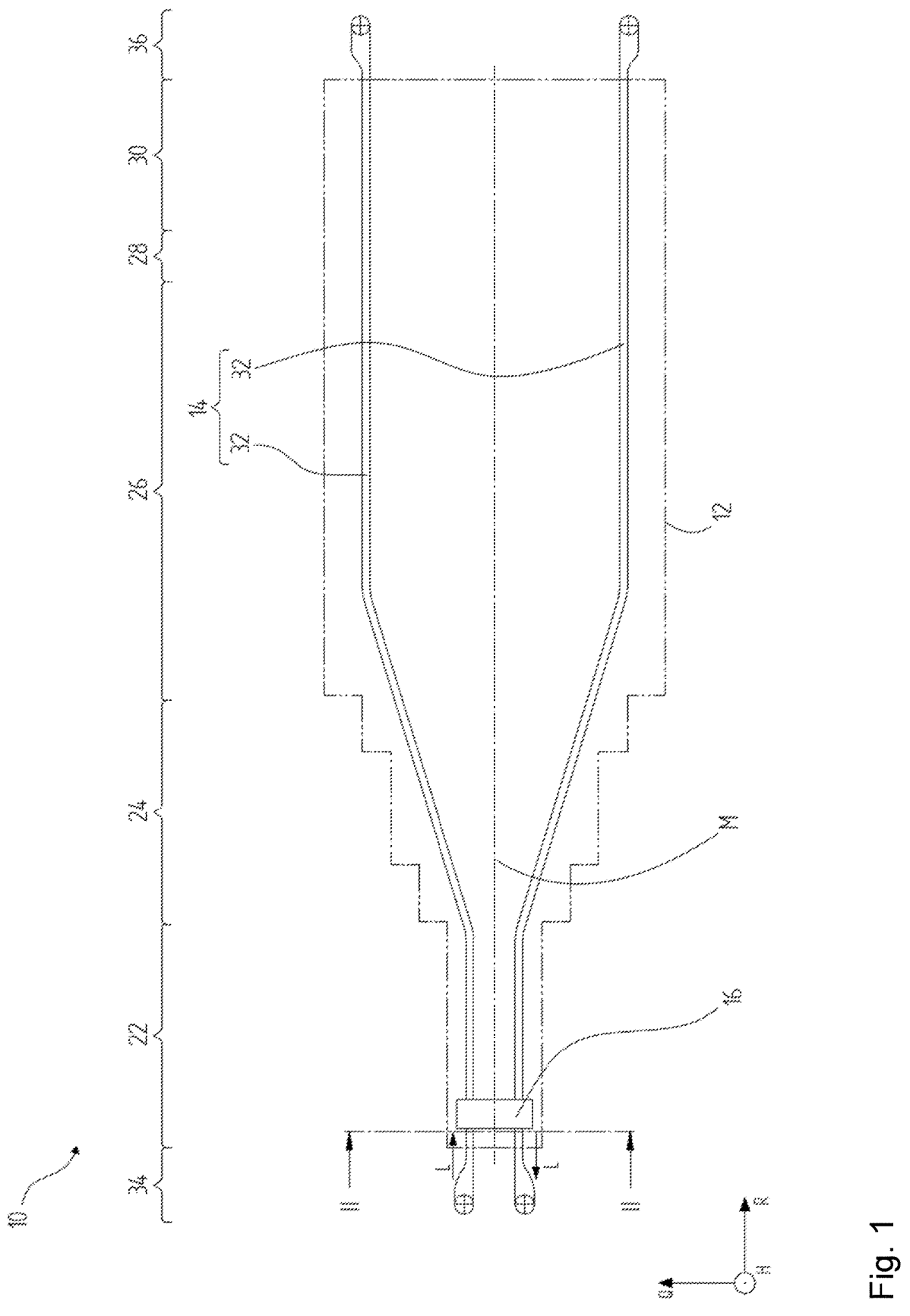

(51) Int. Cl.

| | | |
|---|---|---|
| B29C 35/06 | (2006.01) | |
| B29C 55/02 | (2006.01) | |
| B29L 7/00 | (2006.01) | |
| F27B 9/28 | (2006.01) | |
| F27B 9/30 | (2006.01) | |

(52) U.S. Cl.

CPC .............. F27B 9/28 (2013.01); F27B 9/3005 (2013.01); F27B 9/3011 (2013.01); *B29L 2007/008* (2013.01)

(56) References Cited

U.S. PATENT DOCUMENTS

| | | | | |
|---|---|---|---|---|
| 2004/0121697 A1* | 6/2004 | Kojima | ................. | F27B 9/3005 |
| | | | | 445/24 |
| 2009/0220905 A1 | 9/2009 | Mcgowan | | |

FOREIGN PATENT DOCUMENTS

| | | | | |
|---|---|---|---|---|
| WO | 2014/094803 | 6/2014 | | |
| WO | WO-2022116547 A1 * | 6/2022 | ................ | F27B 9/04 |

* cited by examiner

STRETCHING UNIT AS WELL AS METHOD FOR REDUCING NON-UNIFORM TEMPERATURES AND AIR FLOWS IN A FILM STRETCHING UNIT

CROSS RELATED APPLICATION

This application claims priority to German Application DE 10 2022 113 534.9, filed May 30, 2022, the entire contents of which is hereby incorporated by reference.

The invention relates to a stretching unit for stretching a film as well as method for reducing non-uniform temperatures and air flows in a film stretching unit.

Stretching units are used in particular in the production of plastics films. Typically, the film to be stretched is moved in such units through an oven of the unit in a drawing direction by means of a transport system. The film to be stretched is heated in the oven before the stretching process and also kept at a predefined temperature in and during the stretching process. Subsequently, the stretched film is cooled in the oven.

During the entire process, it is necessary to keep the temperature of the film homogeneous in the traverse direction, i.e. transversely to the drawing direction. Otherwise, processes take place in the film to be stretched in the transverse direction at different times, thereby causing film imperfections and irregular film properties. Non-uniform temperature control in the transverse direction is caused, for example, by undesired air flows in the drawing direction, through which the cold air flows into the oven non-uniformly.

It is thus the object of the invention to provide a stretching unit as well as a method in which non-uniform temperatures of the film are reduced in the transverse direction.

The object is solved by means of a stretching unit for stretching a film, in particular a transverse direction orienter, a machine direction orienter and/or simultaneous stretching unit, comprising an oven and a compensation device. The oven comprises a vertical direction, a transverse direction and a drawing direction. The compensation device comprises an air conveyor, a first compensation opening and a second compensation opening, wherein the first compensation opening and the second compensation opening open into the oven on opposing sides of a central plane of the oven in the vertical and drawing directions. The air conveyor is located in terms of flow between the first compensation opening and the second compensation opening, wherein the compensation device is configured to remove a volume of air from the oven through one of the compensation openings and to feed the removed volume of air into the oven through the other one of the compensation openings.

By means of the compensation device, it is possible to generate air flows on different sides of the film in the transverse direction; said airflows flowing in the opposite direction to the undesired air flows and thus bringing these to a standstill. At the same time, the temperature or the air balance in the oven is not changed as the volume of air withdrawn at one side of the central plane is fed again to the other side of the oven to the same extent.

The compensation device can be free of temperature control devices for the conveyed air.

It is however conceivable that a temperature control device, such as a heat exchanger, is provided in the compensation device. This can be useful to specifically counteract differences in temperature in the oven and/or to compensate heat losses that occur in the compensation device.

In particular, the compensation device is a closed system. The compensation openings do not extend, for example, across the central plane of the oven.

To increase the uniformity of the air flow further, the first compensation opening and the second compensation opening can be designed identically, although this is not a prerequisite.

In one aspect, the first compensation opening and the second compensation opening are located substantially at the same position in the drawing direction so that the compensation device does not generate air flows itself in the machine direction.

In an embodiment, the first compensation opening and the second compensation opening are located in the region of a film infeed into the oven or in the region of a film outfeed out of the oven, thereby avoiding the entry of too cold or too hot air from the environment of the stretching unit.

For example, the first compensation opening and the second compensation opening are located in a neutral zone of the oven, a zone before a neutral zone and/or a zone after a neutral zone. The neutral zone is situated between two zones of the oven with significantly different temperatures, for example an annealing zone and a cooling zone. Thus, air flows along large temperature gradients are prevented, thereby making the stretching unit more efficient.

In one aspect, a film track is defined in the oven, in particular wherein the first compensation opening and the second compensation opening are located in respect to the transverse direction outside the film track and/or are located in respect to the vertical direction at the height of the film track. In this way, the film is not impaired by the air conveyed by the compensation device.

To prevent that the film is blown onto directly, the first compensation opening and the second compensation opening may each comprise two flow openings, wherein in each case one of the two flow openings is located above the film track and the other one of the two flow openings is located below it.

For example, the first compensation opening and the second compensation opening each comprise a plurality of flow openings in at least one flow region, wherein the flow region extends in the vertical direction, in particular, from below the film track to above the film track, or wherein the flow region extends in the transverse direction above or below the film track. Through the plurality of flow openings, interaction with the film is prevented as the air is removed or fed not only at specific points, but also via a larger area.

It is also conceivable that several flow regions are possible.

To avoid contamination of the treatment space, the air conveyor may also be located outside the treatment space.

It is also conceivable that a filter is provided in the compensation device, in particular a pipe of the compensation device. As a result, the purity of the air in the oven can be improved, thereby increasing the quality of the film created.

The air conveyor may be a radial fan to design the compensation device efficiently.

For example, the first compensation opening is flow-connected to the air conveyor via a first pipe and the second compensation opening is flow-connected to the air conveyor via a second pipe in order to maintain defined flow paths.

In particular, the pipes are insulated so that heat losses do not occur as a result of the compensation device which would result in temperature differences in the oven.

In an embodiment, the compensation device comprises a first hinged box that is flow-connected to the outlet side of the air conveyor and a second hinged box that is flow-connected to the intake side of the air conveyor, wherein the first pipe and the second pipe each branch into two branches and in each case one branch is flow-connected to the first hinged box and the corresponding other branch to the second hinged box. In this way, the air flow can be controlled.

The hinged boxes are, for example, two-way distributors.

For example, in a first position of the hinged boxes, the first pipe is flow-connected to the intake side of the air conveyor and the second pipe is flow-connected to the outlet side of the air conveyor, and in a second position of the hinged boxes, the first pipe is flow-connected to the outlet side of the air conveyor and the second pipe is flow-connected to the intake side of the air conveyor. Thus, the air flow can be reversed within the compensation device.

In the case of an automatic control of the compensation device, the stretching unit may comprise one or more sensors for the direction of an air flow and/or one or more pressure sensors.

In an embodiment, the stretching unit comprises a transport system that is configured to transport a film through the oven in the drawing direction, in particular along the film track, thereby achieving high process reliability.

Such transport systems are known, for example from WO2014/094803.

The compensation openings may be provided externally to the transport system in the transverse direction and/or next to the transport system.

The object is also solved by means of a method for reducing non-uniform temperatures and air flows in a stretching unit, comprising the following steps:

measurement of the magnitude of the air flow in the drawing direction and/or the pressure on a side of the central plane of the oven of the stretching unit, and removal of a volume of air from the oven through a first compensation opening on a side of the central plane of the oven by means of a compensation device and feeding the removed volume of air into the oven on the other side of the central plane through a second compensation opening depending on the results of the measurement.

The measurement of the magnitude of the air flow can be automated by means of sensors, but can also occur manually, e.g. by means of a manual flow measurement device.

The features and advantages described for the stretching unit apply equally to the method and vice versa.

Figure 2:
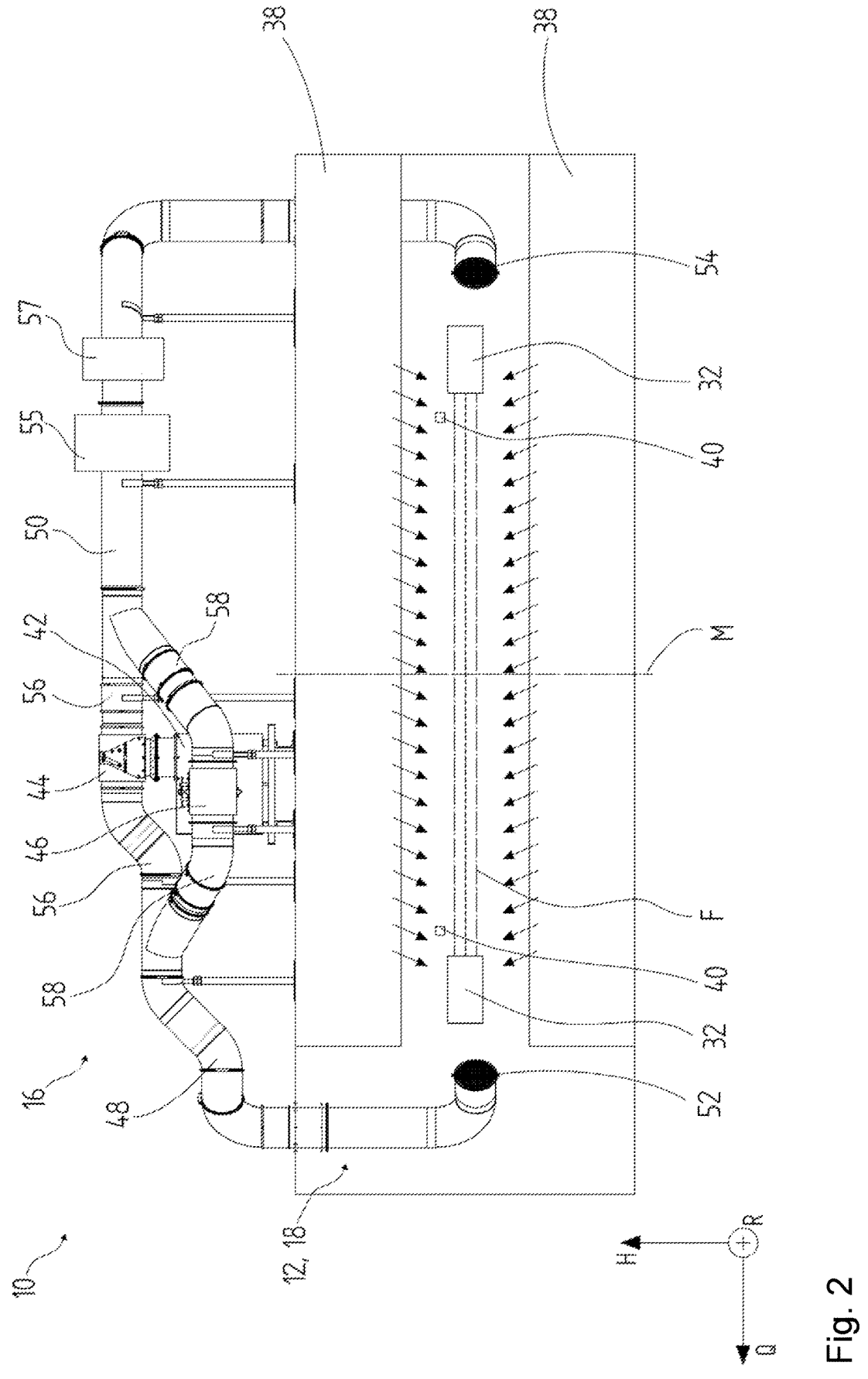
Figure 3:
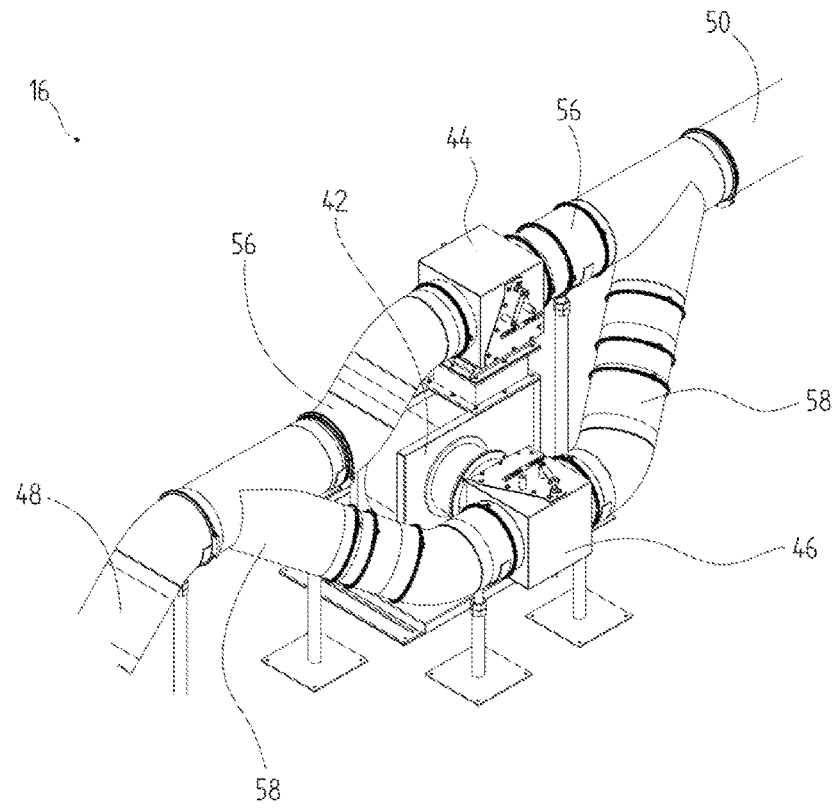
Figure 4:
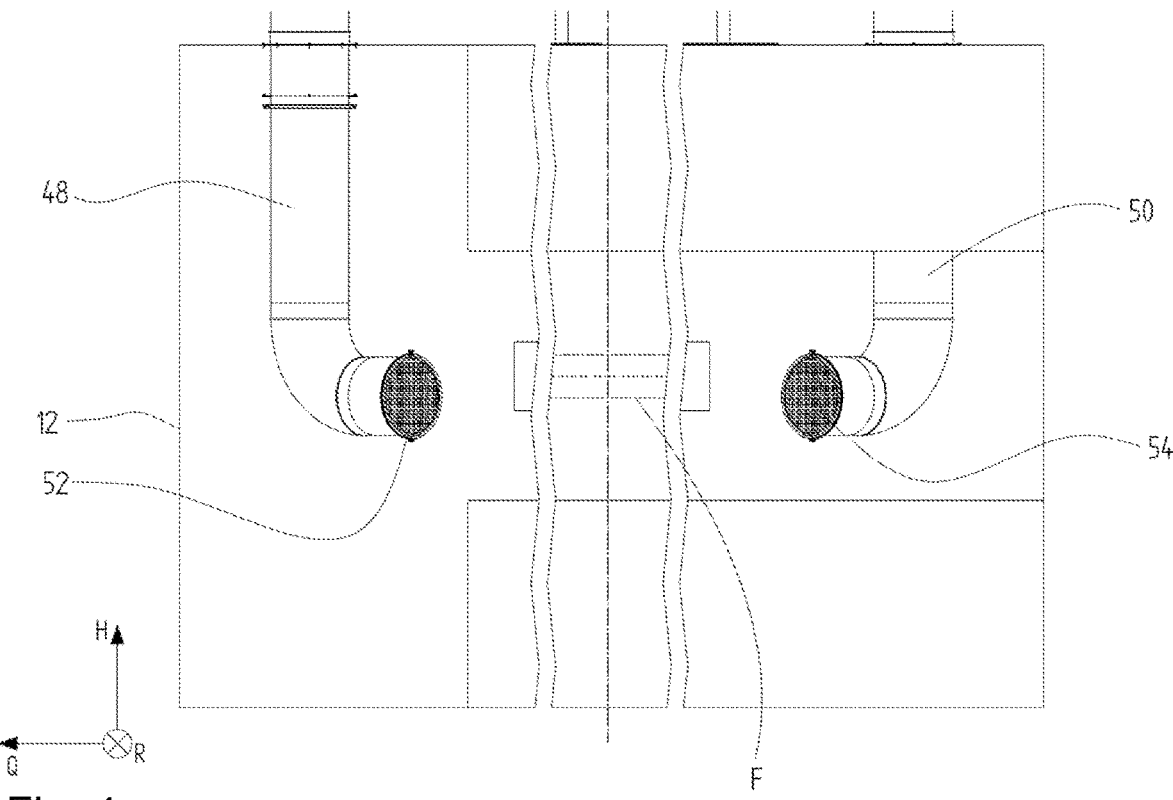
Figure 6:
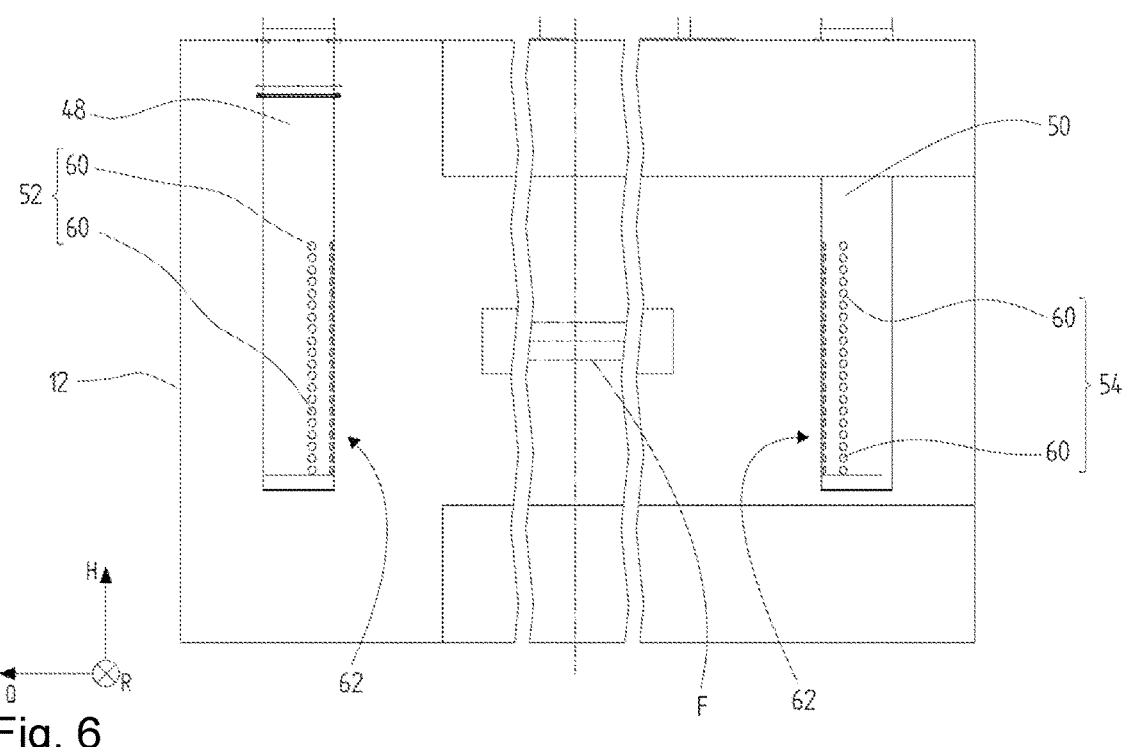
Figure 7:
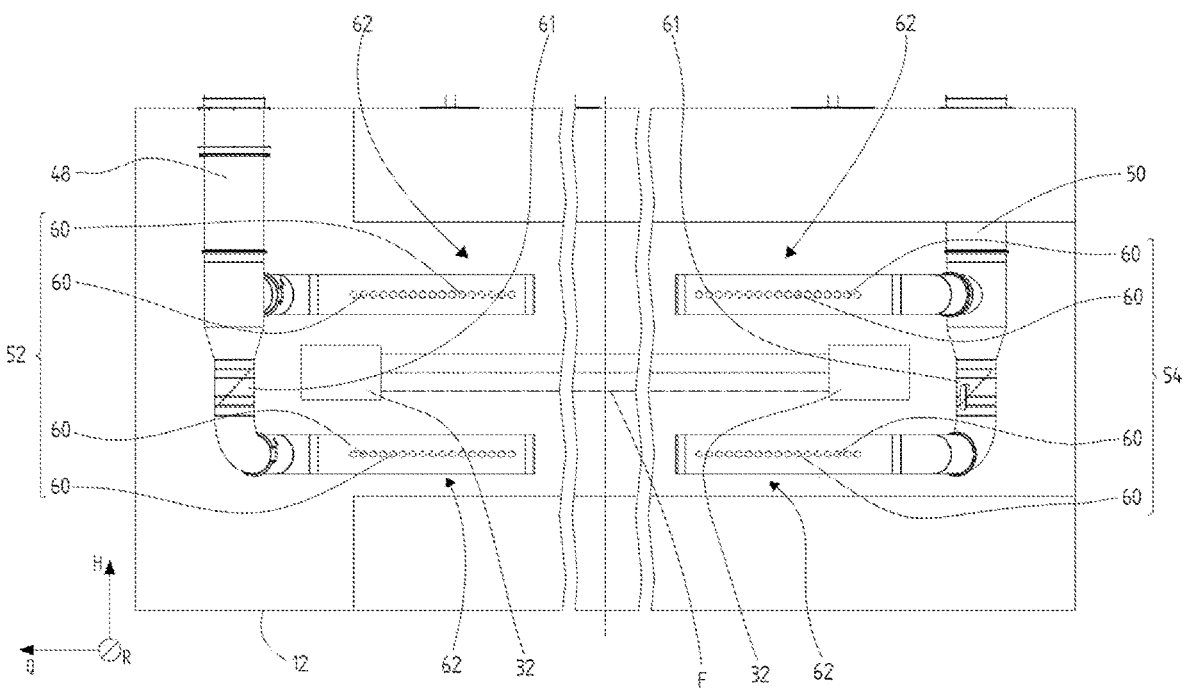
Figure 8:
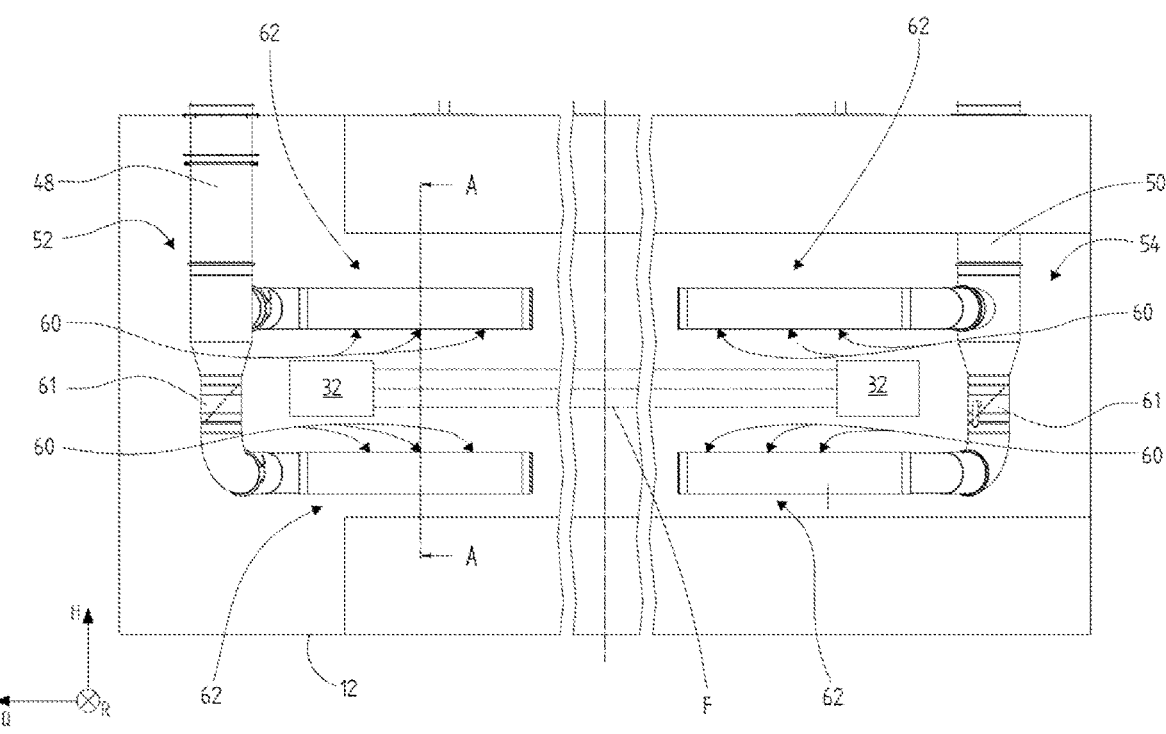
Figure 9:
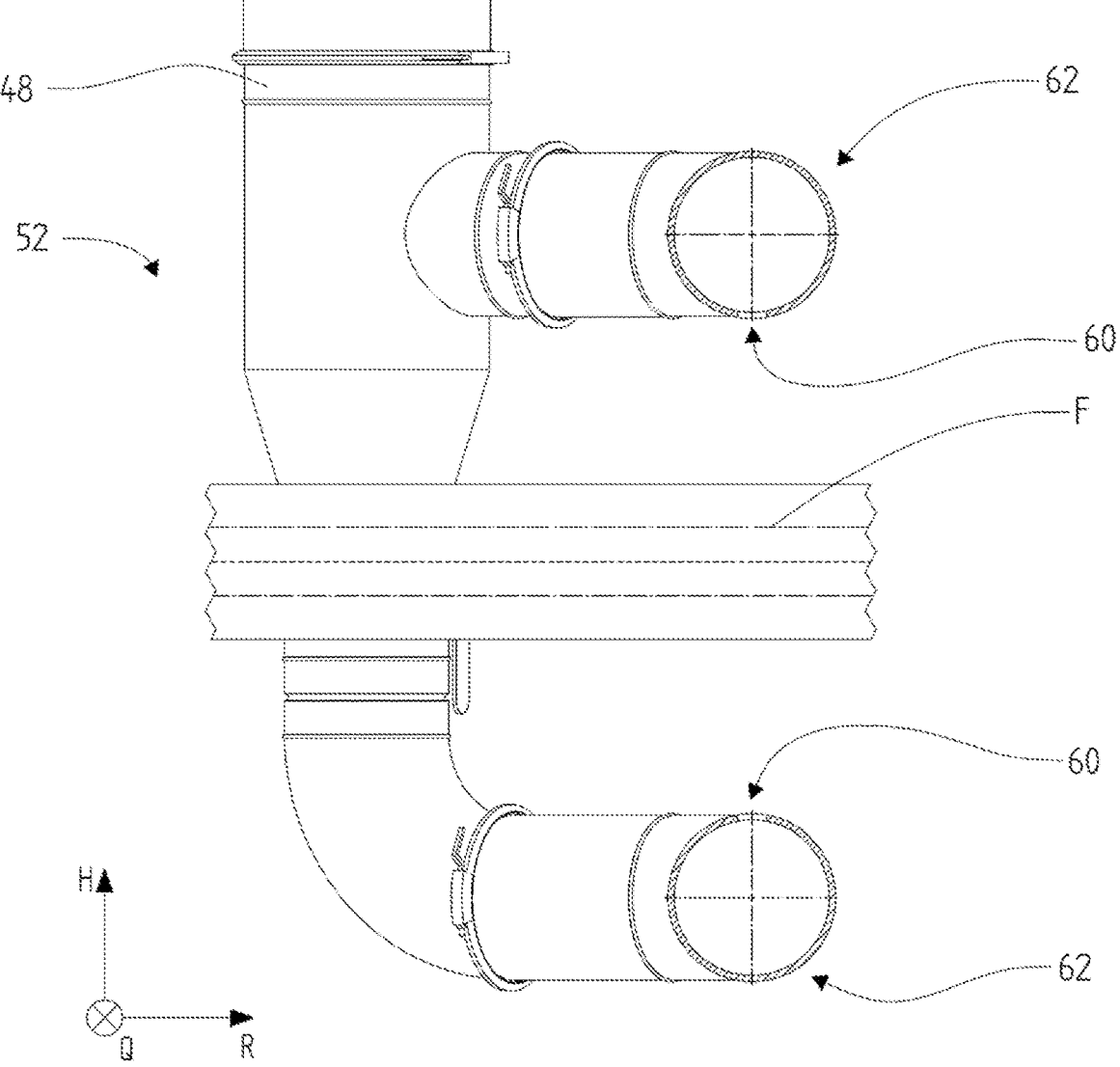

Additional features and advantages of the invention are found in the following description as well as the attached drawings to which reference is made. In the drawings:

FIG. 1 shows a stretching unit according to the invention in top view extremely schematically, FIG. 2 shows a schematic section through the stretching unit according to FIG. 1 along the line II-II, FIG. 3 shows a perspective view of a part of the compensation device of the stretching unit according to FIG. 1, FIG. 4 shows a schematic, shortened section through the stretching unit according to FIG. 1, FIGS. 5, 6 and 7 respectively show a second, third and fourth embodiment of a stretching unit according to the invention in the shortened section, FIG. 8 shows a fifth embodiment of a stretching unit according to the invention in the shortened section, and FIG. 9 shows an enlarged sectional view of FIG. 8 along the line A-A.

In FIG. 1, a stretching unit 10 according to the invention is shown extremely schematically.

In the shown first embodiment, the stretching unit is a transverse direction orienter, also termed TDO. It is also conceivable that the stretching unit is a machine direction orienter or a simultaneous stretching unit.

The stretching unit 10 comprises an oven 12, a transport system 14 as well as a compensation device 16.

The oven 12 has a drawing direction R that is the direction of travel of the film to be stretched. The transverse direction Q of the oven 12 runs transversely to the drawing direction R and horizontally and the vertical direction H runs vertically.

The oven 12 has different zones for treating the film to be stretched along the drawing direction R.

In the first zone 22, also termed preheating zone, the film is heated. In the subsequent second zone 24 ("stretching zone"), the film is stretched in the transverse direction Q so that it has a larger width at the end of the second zone 24 than at the start.

After the stretching is completed, the film then passes through a third zone 26 (termed "heat treatment zone", "further heating zone" and/or "annealing zone"), in which a relaxation of the film can take place at high temperatures.

Then, the film proceeds through a fourth zone 28 and a fifth zone 30 ("cooling zone"), wherein the film is cooled in the fifth zone 30.

The fourth zone 28 is termed the neutral zone and is used to separate the third zone 26 from the fifth zone 30. The neutral zone is, for example, an empty space without ventilation.

The transport system 14 comprises, in a known manner, two transport rails 32 that are located mirror-symmetrically in respect to a central plane M of the stretching unit 10 and the oven 12 and extend at least in part into the oven 12.

In an entry zone 34 as well as an exit zone 36, in which the film to be stretched of the stretching unit 10 is fed and removed, the transport rails 32 run outside of the oven 12.

The film is gripped in the known manner by grippers (not shown) of the transport system 14, which are guided along the transport rails 32, and transported through the oven 12 in the drawing direction R. The film runs here in a film track F (FIG. 2) that is defined in the oven 12 by the transport system 14. The film track F intersects the central plane M.

FIG. 2 shows a section through the stretching unit 10 along the line II-II.

In the oven 12, the transport rails 32 are shown, wherein the film track F is indicated by a chain line and the film by means of a dashed line.

In addition, several nozzle boxes 38 of the oven 12 that convey hot air in the direction of the film web F are shown, as is indicated by means of arrows. By means of the hot air, the film is heated or kept at a predefined temperature.

At least two sensors 40, each one on each side of the central plane M, are provided optionally in the region of the film track F or the transport rails 32. The sensors 40 are configured to measure the direction of an air flow and/or the air pressure prevailing at the sensor 40. Instead of sensors 40, the direction of the air flow may also be determined manually, e.g. by means of a manual flow measurement device that is positioned at the measuring point.

The compensation device 16 comprises an air conveyor 42, a first hinged box 44, a second hinged box 46, a first pipe 48, a second pipe 50, a first compensation opening 52 and a second compensation opening 54.

The air conveyor 42, the hinged boxes 44, 46 and parts of the pipes 48, 50 are provided externally to the oven 12. For example, they are mounted above on a housing of the oven 12.

The pipes 48, 50 extend into the oven 12 and the compensation openings 52, 54 are ultimately provided inside the oven 12.

The compensation openings 52, 54 are located on different sides of the central plane M in the oven 12. In particular, the compensation openings 52, 54 are situated in relation to the transverse direction Q outside the film track F and outside the transport system 14. In other words, the compensation openings 52, 54 are provided next to the transport system 14.

In the drawing direction R, the compensation openings 52, 54 are located at substantially the same position. This means, for example, that the offset of the compensation openings 52, 54 to each other is less than 2 m, in particular less than 1 m, in the drawing direction R.

For example, the compensation openings 52, 54 are located within the same zone 22, 24, 26, 28, 30 or between the zones.

In the shown embodiment, the compensation openings 52, 54 are provided in the region of a film infeed, i.e. in the region within the oven 12 that directly adjoins the entry zone 34. In the example according to FIG. 1, the compensation openings 52, 54 are situated in the first zone 22.

It is also conceivable that the compensation openings 52, 54 are provided in the region of a film outfeed, i.e. within the oven adjoining the exit zone 36. Similarly, the compensation openings 52, 54 can be located in the fourth zone 28, thus the neutral zone. It is also conceivable that the compensation openings 52, 54 are located in the third zone 26 ("heat treatment zone") or in the fifth zone 30 ("cooling zone"). Accordingly, the sensors 40, if present, are to be offset in the drawing direction R.

Several compensation devices 16 can also be provided in different zones.

As can be seen in FIG. 2, the first compensation opening 52 is flow-connected to the air conveyor 42 by means of the first pipe 48. In the same way, the second compensation opening 54 is flow-connected to the air conveyor 42 by means of the second pipe 50 so that the air conveyor 42 is located in terms of flow between both compensation openings 52, 54 in order to convey air from one of the compensation openings 52, 54 to the other compensation openings 54, 52.

The compensation device 16 is thus a closed system so that the volume of air that is removed from the oven 12 at one of the compensation openings 52, 54 is fed into the oven 12 at the other compensation opening 54, 52.

In the shown embodiment, the compensation device 16 is designed without temperature control devices, such as a heater or a cooler. The pipes 48, 50 are however insulated outside the oven 12 in order to not generate temperature fluctuations between the compensation openings 52, 54.

In an alternative embodiment, a temperature control device 55, such as a heat exchanger, can be located in one or both of the pipes 48, 50.

It is also conceivable that one or more filters 57 that filter the air flowing through the compensation device 16 are provided in one or both of the pipes 48, 50.

FIG. 3 shows the section of the compensation device 16 around the air conveyor 42 in a perspective and enlarged view.

The air conveyor 42 is a radial fan in the shown embodiment and thus comprises an outlet side and an intake side.

The first hinged box 44 is connected, i.e. flow-connected, directly to the outlet side of the air conveyor 42. In the same way, the second hinged box 46 is flow-connected with the intake side of the air conveyor 42.

The hinged boxes 44, 46 are, for example, two-way distributors and both are each flow-connected to both the first pipe 48 and the second pipe 50.

To this end, the pipes 48, 50 each branch into two branches 56, 58, wherein in each case the first branch 56, i.e. the first branch 56 of the first pipe 48 and the first branch 56 of the second pipe 50, is flow-connected to the first hinged box 44. In the same way, the second branches 58 of the pipes 48, 50 are each flow-connected to the second hinged box 46.

The hinged boxes 44, 46 can adopt two positions, wherein the hinged boxes 44, 46 are connected in the first position in such a way that the first hinged box 44 connects the second pipe 50 in terms of flow to the outlet side of the air conveyor 42 and the second hinged box 46 connects the first pipe 48 in terms of flow to the intake side of the air conveyor.

In this first position, air is removed from the oven 12 at the first compensation opening 52 and fed into the oven 12 again at the second compensation opening 54. In this case, the first compensation opening 52 is an air outlet and the second compensation opening 54 an air intake for the oven 12.

In the second position of the hinged boxes 44, 46, the first hinged box 44 connects the first pipe 48 in terms of flow to the outlet side of the air conveyor 42 and the second hinged box 46 connects the second pipe 50 to the intake side of the air conveyor 42. In this position, the second compensation opening 54 forms the air outlet and the first compensation opening 52 the air intake for the oven 12. The flow direction of the air is thus reversed in the second position compared to the first position of the hinged boxes 44, 46.

FIG. 4 illustrates again in schematic form the position of the compensation openings 52, 54 in relation to the film track F drawn as a chain line.

In the first embodiment, the compensation openings 52, 54 are in the transverse direction next to the transport system 14 and the film track F. The compensation openings 52, 54 are located in the vertical direction H at the height of the film track F.

The compensation openings do not extend, for example, across the central plane M.

Moreover, the first compensation opening 52 and the second compensation opening 54 are designed identically.

In the operation of typical stretching units 10, undesired air flows form in the drawing direction R which flow in opposite directions on the different sides of the central plane M, as indicated by the arrows designated with L in FIG. 1. To reduce these undesired air flows L, the following method according to the invention is executed.

Initially, the magnitude of the air flows L in the drawing direction R is measured. This can occur by means of the sensors 40. Instead of sensors 40, the direction and magnitude of the air flow may also be determined manually, e.g. by means of a thread that is positioned at the measuring point.

It is also conceivable that the pressure, for example the pressure difference, is determined on both sides of the central plane M.

In the case illustrated in FIG. 1, before compensation device 16 is put into operation, an air flow L exists on the upper side of the central plane M in relation to FIG. 1 (left side in relation to FIG. 2) into the oven 12 and an air flow L out of the oven 12 on the other side of the central plane M (FIG. 1 lower side; FIG. 2 right side).

After measuring the air flows L, which can also occur manually, the compensation device 16 is now put into operation. To this end, the position of the hinged boxes 44, 46 are initially selected in such a way that air is fed into the oven 12 through the compensation device 16 at that compensation opening 52, 54 that is located on the side of the central plane M on which the undesired air flow L flows into the oven 12. This compensation opening is thus an air intake for the oven 12.

In the shown embodiment, this is the first compensation opening 52 so that the hinged boxes 44, 46 are thus placed in the second position.

Subsequently, the air conveyor 42 is put into operation, through which air is removed from the oven 12 through the second compensation opening 54, the same amount being fed again into the oven 12 at the first compensation opening 52.

In this way, a reverse flow to the air flows L is formed that attenuates the undesired airflow L.

To this end, the rotational speed of the air conveyor 42 is increased until the undesired air flow L is at a minimum or has been brought to a standstill. The rotational speed can be regulated automatically or can be adjusted manually.

For example, 42 to 4000 m³ of air per hour is conveyed by the air conveyor, in particular m³/h.

Undesired air flows L that could result in temperature differences of the film in the transverse direction Q are thus minimized or completely prevented by the compensation device 16.

Temperature differences and air flows that can lower the quality of the film produced are therefore avoided reliably, thus improving the quality of the film produced.

The FIGS. 5, 6, 7 and 8 correspond to the representation of FIG. 4. They show further embodiments of a stretching unit 10 according to the invention which substantially correspond to the first embodiment. Therefore, only the differences are discussed hereinafter and the same parts and parts with the same function are provided with the same reference signs.

Figure 5:
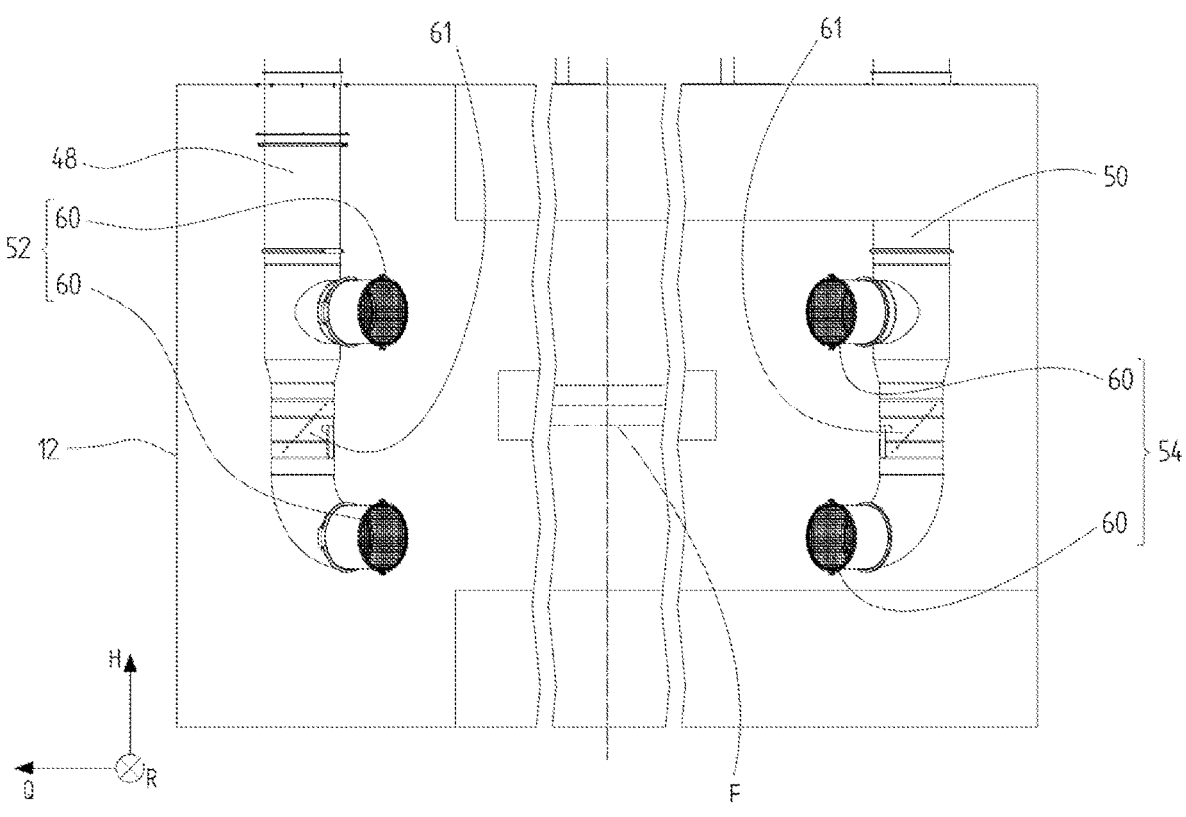

In the second embodiment according to FIG. 5, the first compensation opening 52 and the second compensation opening 54 each comprise two flow openings 60.

The flow openings 60 of the first compensation opening 52 are thus flow-connected to the first pipe 48 and the flow openings 60 of the second compensation opening 54 to the second pipe 50.

In the transverse direction Q, the flow openings 60 are located, as in the first embodiment, next to the film track F, i.e. externally.

In the vertical direction H, the flow openings 60 are located however above and below the film track F. More specifically, one of the flow openings 60 of the first compensation opening 52 and one of the flow openings 60 of the second compensation opening 54 is located above the film track F and the other one of the flow openings 60 of the first compensation opening 52 and the other one of the flow openings 60 of the second compensation opening 54 are located below the film track F. In this way, air from the compensation device is not blown onto the film directly.

A throttle value 61 can be provided in each case between both flow regions 60 of each compensation opening (indicated by a dashed line in FIG. 5). The volume of air removed or supplied above or below the film track F can be regulated by means of the throttle value.

In FIG. 6, a third embodiment of the stretching unit 10 is shown, wherein the first compensation opening 52 and the second compensation opening 54 each comprise a plurality of flow openings 60 which are provided within a flow region 62 of a pipe.

The flow openings 60 can be designed as slits, round holes, elliptical holes, polygonal holes or a combination thereof. The size of the holes may also vary.

In the third embodiment, the flow regions 62 extend in the vertical direction H, namely from above the film track F to below the film track F, so that the flow openings 60 are situated both above, below as well as at the same height as the film track F.

In the transverse direction Q, the flow regions 62 are located next to the film track F.

In the fourth embodiment according to FIG. 7, flow regions 62 are also provided as in the third embodiment according to FIG. 6.

In contrast to the third embodiment, several flow regions 62 are provided per compensation opening 52, 54 and the flow regions 62 extend in the transverse direction Q in the fourth embodiment according to FIG. 7.

More specifically, two flow regions 62 are provided in each case for each compensation opening 52, 54, wherein one flow region 62 of each compensation opening 52, 54 extends above the film track F and the other below the film track F.

In the transverse direction Q, the flow regions 62 extend towards the central plane M, without intersecting it.

For example, all flow regions 62 extend in the transverse direction Q along the transport rails 32 and in part along the film track F. The flow regions 62 can thus protrude in the transverse direction Q in part over the transport system 32 and over the film.

The flow openings 60 are open in and/or opposite to the drawing direction R.

In FIGS. 8 and 9, a fifth embodiment of the stretching unit 10 according to the invention is shown. The fifth embodiment substantially corresponds to the fourth embodiment according to FIG. 7.

In contrast to the fourth embodiment, the flow openings 60 are open in or opposite to the vertical direction H.

As can be seen clearly in FIG. 9, the flow openings 60 are oriented towards the film track F.

The flow openings 60 of the flow regions 62 that extend below the film track F are configured on the top side of the corresponding pipe. Analogously, the flow openings 60 of the flow regions 62 that extend above the film track F are configured on the bottom side of the corresponding pipe.

The air flows exiting the flow openings 60 thus run in or opposite to the vertical direction H and in each case substantially towards the flow track F.

Through the flow regions 62 of the third, fourth and fifth embodiments, interactions with the film are reduced even more.

The invention claimed is:

1. A stretching unit for stretching a film, comprising an oven and a compensation device,
    wherein the oven comprises a vertical direction (H), a transverse direction (Q) and a drawing direction (R),
    wherein the compensation device comprises an air conveyor, a first compensation opening and a second compensation opening, wherein the first compensation opening and the second compensation opening open into the oven on opposing sides of a central plane (M) of the oven in the vertical and drawing directions (H, R),
    wherein the air conveyor is located in terms of flow between the first compensation opening and the second compensation opening,
wherein the compensation device is configured to remove a volume of air from the oven through one of the compensation openings and to feed the removed volume of air into the oven through the other one of the compensation openings.

2. The stretching unit according to claim 1, wherein the first compensation opening and the second compensation opening are designed identically.

3. The stretching unit according to claim 1, wherein the first compensation opening and the second compensation opening are located substantially at the same position in the drawing direction (R).

4. The stretching unit according to claim 1, wherein the first compensation opening and the second compensation opening are located in the region of a film infeed into the oven or in the region of a film outfeed out of the oven.

5. The stretching unit according to claim 1, wherein the first compensation opening and the second compensation opening are located in the region of a neutral zone of the oven, a zone of the oven before a neutral zone or a zone of the oven after a neutral zone.

6. The stretching unit according to claim 1, wherein a film track (F) is defined in the oven, wherein the first compensation opening and the second compensation opening are located in respect to the transverse direction (Q) outside the film track (F) and/or are located in respect to the vertical direction (H) at the height of the film track (F).

7. The stretching unit according to claim 6, wherein the first compensation opening and the second compensation opening each comprise two flow openings, wherein in each case one of the two flow openings is located above and the other one of the two flow openings is located below the film track (F).

8. The stretching unit according to claim 6, wherein the first compensation opening and the second compensation opening each comprise a plurality of flow openings in at least one flow region, wherein the flow region extends in the vertical direction (H), from below the film track (F) to above the film track (F), or wherein the flow region extends in the transverse direction (Q) above or below the film track (F).

9. The stretching unit according to claim 1, wherein the air conveyor is located outside the treatment space and/or that the air conveyor is a radial fan.

10. The stretching unit according to claim 1, wherein the first compensation opening is flow-connected to the air conveyor via a first pipe and the second compensation opening is flow-connected to the air conveyor via a second pipe.

11. The stretching unit according to claim 1, wherein the stretching unit comprises a sensor for the direction of an air flow (L) and/or a pressure sensor.

12. The stretching unit according to claim 1, wherein the stretching unit comprises a transport system that is configured to transport the film through the oven in the drawing direction (R), along the film track (F).

13. The stretching unit of claim 1, wherein the stretching unit is a transverse direction orienter, a machine direction orienter, or a simultaneous stretching unit.

14. The stretching unit according to claim 1, further comprising a temperature control device.

15. The stretching unit according to claim 14, wherein the temperature control device is a heat exchanger.

16. The stretching unit according to claim 1, wherein the oven comprises a plurality of nozzle boxes configured to convey hot air.

17. A stretching unit for stretching a film, comprising an oven and a compensation device, wherein the oven comprises a vertical direction (H), a transverse direction (Q) and a drawing direction (R), wherein the compensation device comprises an air conveyor, a first compensation opening and a second compensation opening, wherein the first compensation opening and the second compensation opening open into the oven on opposing sides of a central plane (M) of the oven in the vertical and drawing directions (H, R), wherein the air conveyor is located in terms of flow between the first compensation opening and the second compensation opening, wherein the compensation device is configured to remove a volume of air from the oven through one of the compensation openings and to feed the removed volume of air into the oven through the other one of the compensation openings, wherein the first compensation opening is flow-connected to the air conveyor via a first pipe and the second compensation opening is flow-connected to the air conveyor via a second pipe, wherein the compensation device comprises a first hinged box that is flow-connected to the outlet side of the air conveyor and a second hinged box that is flow-connected to the intake side of the air conveyor, wherein the first pipe and the second pipe each branch into two branches and in each case one branch is flow-connected to the first hinged box and the corresponding other branch to the second hinged box.

18. The stretching unit according to claim 17, wherein in a first position of the hinged boxes, the first pipe is flow-connected to the intake side of the air conveyor and the second pipe is flow-connected to the outlet side of the air conveyor, and in a second position of the hinged boxes, the first pipe is flow-connected to the outlet side of the air conveyor and the second pipe is flow-connected to the intake side of the air conveyor.

* * * * *